United States Patent Office 3,188,274
Patented June 8, 1965

3,188,274
PRODUCING VASODILATATION AND ANALEPTIC ACTIVITY WITH THERAPEUTIC COMPOSITIONS CONTAINING AROMATIC FURAN DERIVATIVES
Gustave Derouaux, 83 Rue Louvrex, Liege, Belgium
No Drawing. Filed Apr. 5, 1962, Ser. No. 185,209
Claims priority, application Belgium, May 26, 1961, 604,272/61
2 Claims. (Cl. 167—65)

The present invention relates to therapeutic compositions containing aromatic furan derivatives.

The therapeutic compositions provided by the invention comprise a pharmaceutically acceptable vehicle or excipient and as active ingredient, at least one furan derivative of the general formula

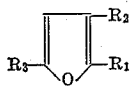

(I)

in which $R_1$ is hydrogen, a low alkyl radical or a benzoyl radical which may be substituted, $R_2$ is hydrogen when $R_1$ is a benzoyl radical which may be substituted or $R_2$ is a benzoyl radical which may be substituted when $R_1$ is hydrogen or a low alkyl radical, and $R_3$ stands for hydrogen or a low alkyl radical.

The benzoyl radical can for example be substituted by at least one halogen atom, more particularly by two iodine atoms in the 3' and 5' positions.

The following are specific examples of compounds represented by the general Formula I:

2-(p-hydroxybenzoyl)-furan
5-ethyl-2-(p-hydroxybenzoyl)-furan
2-(3',5'-diiodo-4'-hydroxybenzoyl)-furan
5-ethyl-2-(3',5'-diiodo-4'-hydroxybenzoyl)-furan
2,5-dimethyl-3-(p-methoxybenzoyl)-furan
2,5-dimethyl-3-(p-hydroxybenzoyl)-furan
2,5-dimethyl-3-(3',5'-diiodo-4'-hydroxybenzoyl)-furan It has been found that the compounds corresponding to the general Formula I, and particularly the specific compounds referred to above, have beneficial pharmacological properties. Thus, these compounds act on the musculature of the isolated intestine of a guinea pig, in that they inhibit the contractions of the musculature caused by histamine.

The therapeutic compositions according to the present invention can be used for the treatment of diseases or defects of the circulatory system, such as angina, coronaritis myocardial infarct, sequelae of infarct, circulatory deficiencies in the extremities (Raynaud's syndrome), thromboangiitis, and vascular spasms. These compositions have also a potent analeptic action on the respiratory system.

Moreover, it has been found that the compounds in question have a dilatory effect on the coronary blood vessels, as has been shown by tests carried out on the isolated heart of a rabbit, by measurement of the cardiacal delivery after perfusion.

The compositions according to the present invention are generally intended for peroral or parenteral administration. Therapeutic compositions to be administered perorally may, for example be in the form of tablets, dragees, capsules, in which at least one compound of the general Formula I is mixed with a solid pharmaceutically acceptable vehicle or excipient. The therapeutic compositions can also be used in the form of liquid preparations for oral administrations, especially syrups, elixirs, and aqueous dispersions or solutions.

The therapeutic compositions according to the present invention can also be used in the form of solutions to be administered parenterally. Solutions or suspensions for injections purposes can be prepared by using, for example, distilled water or sterile apyrogenic water, in which at least one compound of the aforementioned Formula I is dissolved or suspended, if desired in the presence of a dissolving or stabilizing agent, such as propylene glycol.

Finally, it is possible for the compounds according to Formula I to be administered rectally, by incorporating them in a composition for suppositories, for example in coca butter.

The compounds corresponding to the general Formula I can be administered in varying doses, depending on the particular compound being used, the state of the patient and the method of administration.

Thus, the compounds in question can be administered in doses from 50 to 600 mg. per day, in the form of several doses taken throughout the day.

Several examples of therapeutic compositions according to the invention are given below.

I. TABLETS

| | Mg. |
|---|---|
| Furan derivative of Formula I | 100 |
| Starch | 100 |
| Talc | 50 |
| Magnesium stearate | 5 |

II. AMPOULES FOR INJECTION INTRAVENOUSLY OR INTRAMUSCULARLY

Furan derivative of Formula I _____mg__ 100
Buffering phosphate to pH _____ 7.5
Apyrogenic water, to make 1 ml.

III. SUPPOSITORIES

Furan derivative of Formula I _____mg__ 100
Cocoa butter to make 1 suppository.

The compounds of the general Formula I can be prepared by a condensation reaction between a furan derivative and a phenol derivative. Thus, in order to prepare the 2-p-hydroxybenzoyl furan, phenol is reacted with furoyl chloride in the presence of a condensation agent. Similarly, in order to obtain 5-ethyl-2-(p-hydroxybenzoyl)-furan, the 5-ethyl furoyl chloride is reacted with phenol. The benzoyl derivatives of furan substituted in the 2 and 5 positions of the furan nucleus are advantageously prepared by reaction of furan substituted in the 2 and 5 positions with an alkoxybenzoyl chloride, the compound obtained being, if necessary, hydrolyzed by replacing the alkoxy group attached to the benzoyl radical by a hydroxyl group. Thus, in order to prepare the 2,5-dimethyl-3-(p-methoxybenzoyl)-furan, it is possible to react 2,5-dimethyl furan with p-methoxybenzoyl chloride. The 2,5-dimethyl-3-(p-methoxybenzoyl)-furan can be converted into 2,5-dimethyl-3-(p-hydroxybenzoyl)-furan by hydrolysis with dilute hydrochloride acid. As regards the compounds of the general Formula I which carry halogen atoms, for example iodine atoms in the positions 3' and 5' of the benzoyl group, these are obtained by halogenation of corresponding non-halogenated compounds, for example, by the process described by Wheeler in "American Chemical Journal," 1909, 42, 449.

Several methods of preparing the compounds of the general Formula I contained in the therapeutic compositions according to the invention will now be described by way of illustration.

*Example 1.—Preparation of 2-(p-hydroxybenzoyl)-furan*

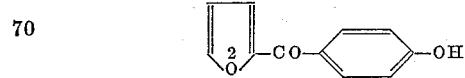

73 g. of phenol, 400 ml. of nitrobenzene and 105 g. of anhydrous aluminium chloride were mixed in a 2 litre three-necked flask equipped with a stirrer device, a reflux condenser and a dropping funnel.

While cooling in an iced water bath and stirring vigorously, a solution of furoyl chloride (101 g.) in nitrobenzene (200 ml.) was introduced gradually. When the introduction was complete, the mixture was allowed to attain room temperature and it was then maintained for 5 hours at 60° C. After cooling to about 20° C., the mixture was decomposed with a mixture of ice and hydrochloric acid, and then the organic layer decanted. The organic layer was first of all washed with a saturated solution of sodium bicarbonate, then subjected to extraction with an aqueous 10% sodium hydroxide solution. After separation by decantation of the nitrobenzenic layer, the aqueous layer was acidified to pH 6 by hydrochloric acid, the precipitate separated by filtration under pressure and the latter purified by recrystallization in boiling water. After drying under vacuum, fine pale yellow needles wire obtained which melt at 164.3° C.

*Example 2.—Preparation of 5-ethyl-2-(p-hydroxybenzoyl)-furan*

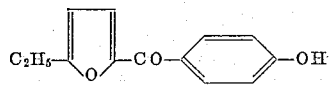

35 g. of phenol and 150 ml. of nitrobenzene were placed in a 500 cc. flask equipped with a stirrer device and thermometer. 62.5 g. of anhydrous aluminium chloride and then 55.5 g. of 5-ethyl-furoyl chloride (B.P. 98° C./19/ mm.) were then gradually added thereto while cooling by means of an ice bath. When the addition was complete, the mixture was allowed to return gradually to 20° C. and it was left for 2 days at this temperature. The mixture was then kept at 60° C. for 7 hours, thereafter cooled and decomposed with iced water, the organic layer was decanted and washed with saturated sodium bicarbonate. Extraction was carried out with an aqueous caustic soda solution, the alkaline layer acidified, the precipitate centrifuged and purified by recrystallization from aqueous ethyl alcohol. 16 g. of pure product were obtained in the form of white needles which melted at 131.5° C. (equivalent found by potentiometric titration: 214; calculated: 216).

*Example 3.—Preparation of 2-(3',5'-diiodo-4'-hydroxybenzoyl)-furan*

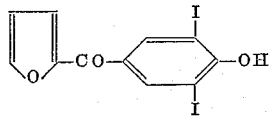

0.1 mol of the compound obtained as described in Example 1 was dissolved in an equivalent of 0.15 N-caustic soda. While stirring, the pH value was maintained between 10 and 11 by means of dilute caustic soda, and 0.44 g. of iodine (in concentrated aqueous solution of potassium iodide) was added. The mixture was acidified and the precipitate separated by filtration. After washing with sodium bisulphite, the iodized derivative was purified by recrystallization (from ethyl alcohol or from acetic acid, for example) or by chromatography on alumina.

M.P. _____ 152° C.
Iodine content _____ 57.2% (calculated: 57.8%).
Equivalent found _____ 440 (calculated: 440.16).

*Example 4.—Preparation of 5-ethyl-2-(3',5'-diiodo-4'-hydroxybenzoyl)-furan*

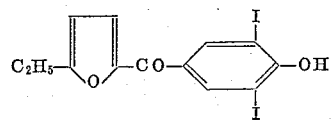

0.1 mol of the compound obtained as described in Example 2 were dissolved in an equivalent of 0.15 N-caustic soda. While stirring, the pH value was maintained between 10 and 11 by means of dilute caustic soda, 0.44 g. of iodine (in concentrated aqueous solution of potassium iodide) was added. Acidification was carried out, and the precipitate separated by filtration. After washing with sodium bisulphite, the iodized derivative was purified by recrystallization (from ethyl alcohol or from acetic acid, for example) or by chromatography on alumina.

M.P. _____ 127° C.–127.6° C.
Iodine content _____ 54.03% (calculated: 54.25%).

*Example 5.—Preparation of 2,5-dimethyl-3-(p-methoxybenzoyl)-furan*

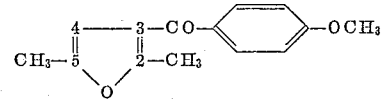

25 cc. of anhydrous stannic chloride were gradually added while cooling to a mixture of dimethyl-2,5-furan (73.6 g.) and p-methoxybenzoyl chloride (136.4 g.) in carbon sulphide (300 ml.) After being left at the temperature of the laboratory, the mixture was decomposed with a mixture of ice and hydrochloric acid and carefully extracted with ether. After washing with a dilute caustic soda solution and then with water, the ethereal layer was dried over magnesium sulphate. The solvent was driven off and rectified under reduced pressure. 72 g. of product, which had the following characteristics, were obtained, M.P. _____ 55–56° C.
Boiling point _____ 138°C./0.3 mm.
Molecular weight _____ 227 (calculated: 230).

*Example 6.—Preparation of 2,5-dimethyl-3-(p-hydroxybenzoyl)-furan*

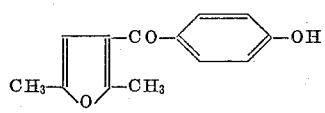

A mixture of 2,5-dimethyl-3-(p-methoxybenzoyl)-furan (100 g.) and pyridine hydrochloride (300 g.) was kept for 1 hour at 210 to 215° C. After cooling, the mixture was treated with dilute hydrochloric acid and extracted with ether. The ethereal layer was in turn extracted with a 2 N solution of caustic soda. On acidification, a tarry precipitate was obtained, which was purified by chromatography on alumina in benzenic solution. There were finally obtained 65 g. of white product melting at 145° C. (equivalent obtained: 214; calculated: 216).

*Example 7.—Preparation of 2,5-dimethyl-3-(3',5'-diiodo-4'-hydroxybenzoyl)-furan*

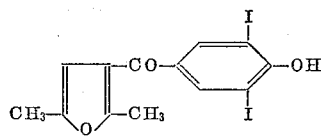

0.1 mol of the compound obtained in Example 6 was dissolved in an equivalent of 0.15 N-caustic soda. While stirring, the pH value was kept at between 10 and 11 by means of dilute caustic soda and 0.44 g. of iodine (in concentrated aqueous solution of potassium iodide) added. The mixture is acidified and the precipitate separated by filtration. After washing with sodium bisulphite, the iodized derivative was purified by recrystallization (for example from ethyl alcohol or acetic acid) or by chromatography on alumina.

M.P. _____ 170 to 172° C.
Iodine content _____ 54.5% (calculated 54.25%).

What I claim is:
1. A method for producing vasodilatation and analeptic activity in animal subjects comprising administering to said subjects, vasodilatation and analeptic producing quantities in dosage units, of an active ingredient constituted by a furan derivative of the general formula:

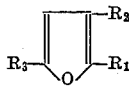

in which $R_1$ and $R_2$ are selected from the group consisting of hydrogen, the 4'-hydroxybenzoyl radical and the 3',5'-diiodo-4'-hydroxybenzoyl radical, provided that when $R_1$ is hydrogen, $R_2$ is selected from the group consisting of the 4-hydroxybenzoyl and 3',5'-diiodo-4'-hydroxybenzoyl radicals and when $R_1$ is selected from the group consisting of the 4'-hydroxybenzoyl and 3',5'-diiodo-4'-hydroxybenzoyl radicals, $R_2$ is hydrogen, and $R_3$ is selected from the group consisting of hydrogen and the methyl and ethyl radicals, 50 to 600 mg. of said furan derivative being used per dosage unit at least until vasodilatation and analeptic activity has been produced in said subjects.

2. A method as claimed in claim 1 wherein said furan derivative is selected from the group consisting of: 2-(p-hydroxybenzoyl)-furan, 5-ethyl - 2 - (p-hydroxybenzoyl)-furan, 2-(3',5'-diiodo-4'-hydroxybenzoyl)-furan, 5-ethyl-2-(3',5'-diiodo-4'-hydroxybenzoyl)-furan, 2,5-dimethyl-3-(p-methoxybenzoyl)-furan, 2,5-dimethyl - 3 - (p-hydroxybenzoyl)-furan, and 2,5-dimethyl-3-(3',5'-diiodo-4'-hydroxybenzoyl)-furan.

References Cited by the Examiner

Hayes et al., "Some Furan Antihistamic Agents," J.A.C.S., 72, pages 1205–8 (1950).

Vaughan et al., "Antihistamine Agents, II, Furan Derivatives," J.A.C.S., 70, pages 2607–8 (1948).

LEWIS GOTTS, *Primary Examiner.*